United States Patent
Brewer

(10) Patent No.: US 6,318,476 B1
(45) Date of Patent: Nov. 20, 2001

(54) HAND GRADER

(76) Inventor: Bradley N. Brewer, 342 Manning Hill Rd., Winchester, NH (US) 03470

( * ) Notice: Subject to any disclaimer, the term of this patent is extended or adjusted under 35 U.S.C. 154(b) by 0 days.

(21) Appl. No.: 09/648,342

(22) Filed: Aug. 25, 2000

Related U.S. Application Data

(60) Provisional application No. 60/150,917, filed on Aug. 26, 1999.

(51) Int. Cl.$^7$ ........................................................ A01B 1/00
(52) U.S. Cl. ............................ 172/371; 172/765; D8/11
(58) Field of Search ................................. 172/371, 375, 172/380, 377, 765; 37/284, 285; D08/11; 30/171; 7/114, 116, 167

(56) References Cited

U.S. PATENT DOCUMENTS

| | | | | |
|---|---|---|---|---|
| 158,373 | * | 1/1875 | Green ..................................... | 172/371 |
| D. 277,258 | * | 1/1985 | Baty ........................................ | D8/11 |
| D. 380,654 | * | 7/1997 | Chen ....................................... | D8/11 |
| 1,148,534 | * | 8/1915 | Pringle ................................... | 172/375 |
| 1,661,954 | * | 3/1928 | Michaelis ............................. | 172/375 |
| 1,798,036 | * | 3/1931 | Schulz .................................... | 172/371 |
| 1,987,846 | * | 1/1935 | Connor .................................... | 97/71 |
| 2,400,241 | * | 5/1946 | Linden .................................... | 97/66 |
| 2,737,101 | * | 3/1956 | Hutchins ................................ | 172/371 |
| 2,752,839 | * | 7/1956 | Robertson ............................... | 97/66 |
| 2,785,483 | * | 3/1957 | Gajewski ................................ | 37/53 |
| 3,144,084 | * | 8/1964 | Smith ...................................... | 172/15 |
| 3,465,457 | * | 9/1969 | Stone ...................................... | 37/268 |
| 4,546,831 | * | 10/1985 | Albertson .............................. | 172/13 |
| 4,611,666 | * | 9/1986 | Albertson .............................. | 172/13 |
| 5,309,654 | * | 5/1994 | Mathis .................................... | 37/284 |
| 5,452,769 | * | 9/1995 | Markert ................................. | 172/380 |
| 5,676,413 | * | 10/1997 | Hauck .................................... | 294/54.5 |
| 6,044,914 | * | 4/2000 | Johnson ................................. | 172/377 |
| 6,109,362 | * | 8/2000 | Simpson, Sr. ......................... | 172/375 |

* cited by examiner

*Primary Examiner*—Thomas B. Will
*Assistant Examiner*—Kristine Markovich
(74) *Attorney, Agent, or Firm*—Deborah A. Basile

(57) ABSTRACT

The Hand Grader tool is designed so as to allow the user to grade material such as sand, loam, gravel, stone or wet concrete and due to the angle of the faces it eliminates the need of the user to apply pressure upwardly or downwardly on the tool to carry the materials to grade. The tool will thus save energy and assist in efficient completion of a task. The tool consists of a hoe type handle approximately 5 feet long made of an appropriate material and approximately 1⅛ inch in diameter connected through a split pipe member to a single piece of five gauge steel 6¾ inches long by 6 to 20 inches wide. The steel is bent to 140° inclusive angle. The angle is bent in the center leaving two faces of 3⅜ inches in width. The handle is engaged at an angle greater than 90° with one face and centered along the length of the face.

1 Claim, 2 Drawing Sheets

HAND GRADER

CROSS REFERENCE TO RELATED APPLICATIONS

Provisional Patent Application Ser. No. 60/150,917, filed Aug. 26, 1999.

STATEMENT REGARDING FEDERALLY SPONSORED RESEARCH AND DEVELOPMENT

Not Applicable.

MICROFICHE APPENDIX

Not Applicable.

BACKGROUND OF THE INVENTION

1. Field of the Invention

The invention relates to an improvement on a hand tool which would be used by an individual to move and grade various materials such as sand, loam, gravel, stone or wet concrete. The Hand Grader is designed so as to ease the degree of exertion by the user in moving the product and grading the product. The tool has a handle which is approximately 5 feet long and 1⅛ inch in diameter which is grasped by the user. The head of the tool consists of one piece of steel bent at an angle of 140° inclusive. The handle is attached to the surface of one of the faces in proximity to the bend where the faces meet so that the handle forms an angle greater than 90° with the face to which it is attached and forms an angle less than 50° to the other face. The width of the head may range between 6 inches to 20 inches wide for different applications.

The tool is used to move or spread materials such as sand, loam, gravel, stone or wet concrete over the ground in a garden or to extract concrete from a form in concrete construction. The tool due to its design carries its own grade meaning it does not submerge into the material but remains level. This eliminates the need of the user to apply pressure upwardly or downwardly on the tool to carry the materials to grade. The force of the user can then be applied to pull the material towards the user and to accomplish the work being done as opposed to applying pressure in an upward or downward direction.

2. Description of Related Art

Currently in the field of art there are hoes and tools known as "Kum-a-Longs" which are used to move sand, loam, gravel or wet cement as needed in a garden or on a construction site. Hoes are designed so that the head of the hoe and specifically the face submerges within the material to be moved. This is useful for some applications however it is not useful for grading the material over a surface area. Hoe type tools are nothing more than an "ax blade" turned at right angles to the handle. They are made to "chop" and force the blade into the working surface. This blade was never angled to allow it to pull itself into the product without excess downward pressure. As far as construction of the "hoe" type tools, just having the handle off-set so far from the working edge constitutes weak construction.

"Kum-a-Longs" generally consist of a handle similar to that of the Hand Grader attached to a steel head which is arched or bent in an arc having a radius of approximately eight inches. The "Kum-a-Longs" in that fashion slides over the top of the concrete or other material and thus is not useful in grading. Also, one cannot pick up a mass of wet concrete on a "Kum-a-Long" and expect that it is maintained within the face of the tool. "Kum-a-Longs" as they are referred to in the cement trade, are nothing more than a glorified, wide hoe. It is difficult to strengthen a single piece of metal when it is required to be narrow in width and long in length, without including either a turned edge for strength or increasing the thickness of the material. What they have done to regain the needed strength is to curve the metal much as a snow plow blade is curved. The only problem with this is that it leaves a curved surface with which to tamp with and as anyone would agree this would be better flat. Those in the business of placing concrete with a "Kum-a-Long" as they are constructed to date complain that if they hook into something like wire rebar, "wet-leads", etc. with the end of the blade, the blade bends and after repeated bends the blade becomes fatigued and weak in that area and will eventually break. The inventor has over the years welded and straightened many "Kum-a-Longs" and has seen a need for a new tool design to overcome the shortcomings of the current art in this area. Most handles in the standard "Kum-a-Longs" are attached by driving them into a blind hole. When removing a broken handle, it requires drilling in order to extract the broken stub, an extremely time-consuming task.

Therefore the inventor has identified a need for a tool which can be used to pull and lift wet concrete and other material and which can be used to tamp the edges of a concrete pour. As well, the angled edge of the Hand Grader can be used as a float on a concrete pour.

BRIEF SUMMARY OF THE INVENTION

The Hand Grader is a unique tool which is used to pull and lift material such as sand or concrete and which can be used to tamp the edges of a concrete pour and as a float on the surface of a concrete pour. The unique angle of the faces of the head of the tool in relationship to each other and also in relationship to the location of the handle allows the user of this tool to grade concrete or other material without the tool plunging into the surface of the concrete. This invention consists of a significant improvement over existing hand tools which will save time and energy of the user in accomplishing a job.

DETAILED DESCRIPTION OF THE INVENTION

Figure 1:
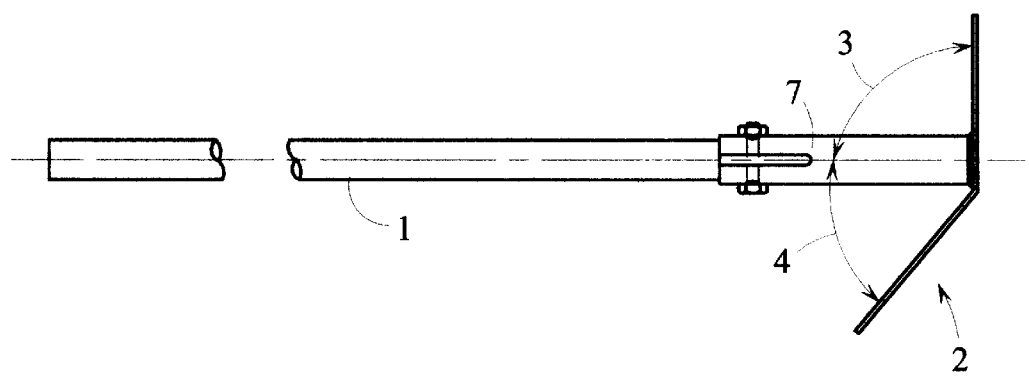
FIG. 1 is a side view of the present invention.
Figure 2:
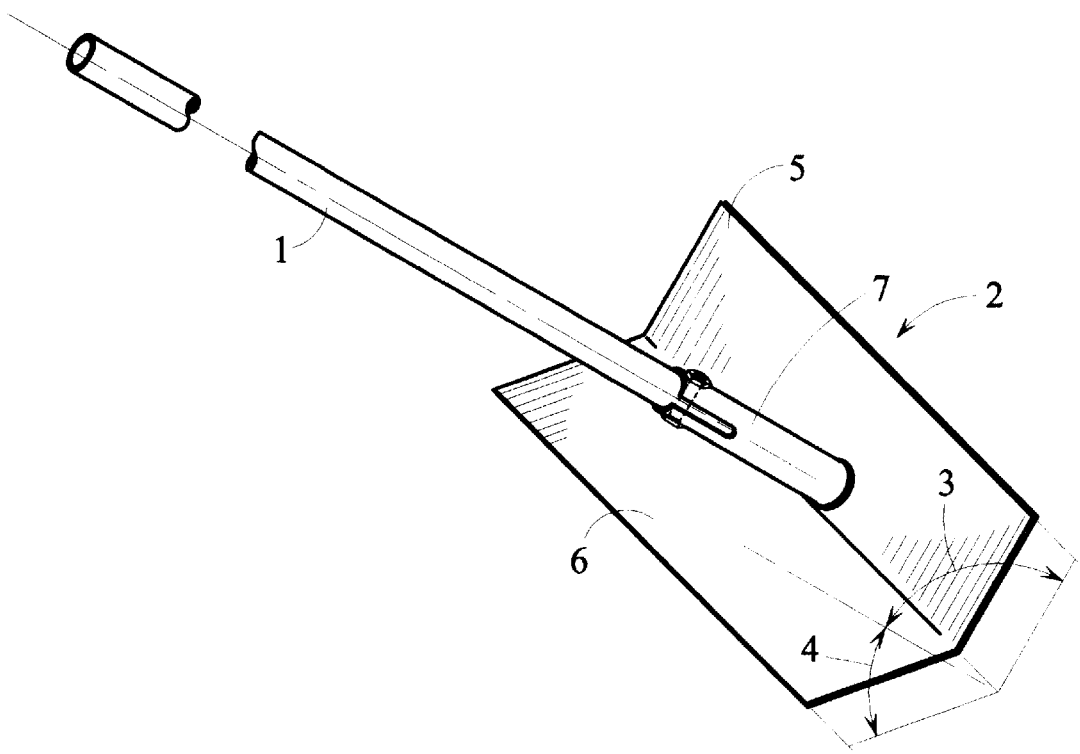
FIG. 2 is a perspective view of the present invention.

The invention is based on the concept of designing a tool with appropriate angles for performing a particular task. The preferred embodiment has several features including the following:

A handle 1 made of wood, aluminum or other appropriate material of at least 5feet in length and approximately 1 ⅛ inch in diameter.

An expandable split pipe member 7 made of steel to connect the handle to the head 2 of the tool. The split pipe member 7 consisting of two counterparts which come together to engage the handle 1 and are rounded to conform to the size of the handle 1 and which become one at the base and having apertures through each side which will receive a bolt to be engaged transversely through the handle 1 and through each aperture and secured firmly.

A head 2 consisting of five gauge steel having two faces 5, 6 and bent horizontally to form an inclusive angle of 140°. The steel head 2 is approximately 6¾ inches in length, each face 5, 6 being 3⅜ inches long.

The split pipe member 7 is welded to the surface of one of the faces 5 in proximity to the bend where the faces 5, 6 meet so that the handle 1 forms an angle 3 greater than 90° with the face 5 to which it is attached and forms an angle 4 less than 50° to the other face 6.

The tool is used by the user grasping the handle 1 such that the angle 3 greater than 90° is above the handle 1 and the angle 4 less than 50° is below the handle 1. The Hand Grader is drawn over the material to be spread or graded. The Hand Grader may be used to lift material and move it as necessary. The face 5 which is at an angle 3 greater than 90° with the handle 1 may be used to tamp a finished concrete pour. The face 6 which is at an angle 4 less than 50° to the handle may be used as a float on the surface of a finished pour.

What is claimed is:

1. A hand held tool comprising:

An elongated handle having a length of not less than 5 feet and a circumference of not less than 1¼ inches;

a head constructed of one solid piece of five gauge steel having a length of 6¾ inches and a width of between 6 and 20 inches; and said head being bent to 140° inclusive angle creating two faces of said head being 3⅜ inches long each; and said head having a split pipe member attached to the surface of one of the said faces in proximity to the bend where the faces meet so that said pipe member forms an angle greater than 90° with the face to which it is attached and forms an angle less than 50° to the other face; and engaged within said split pipe member said handle and through said split pipe member transversely a bolt to secure said handle within said split pipe member.

* * * * *